March 7, 1933. R. B. WADE 1,900,593
SHAFT BEARING
Filed Sept. 16, 1929
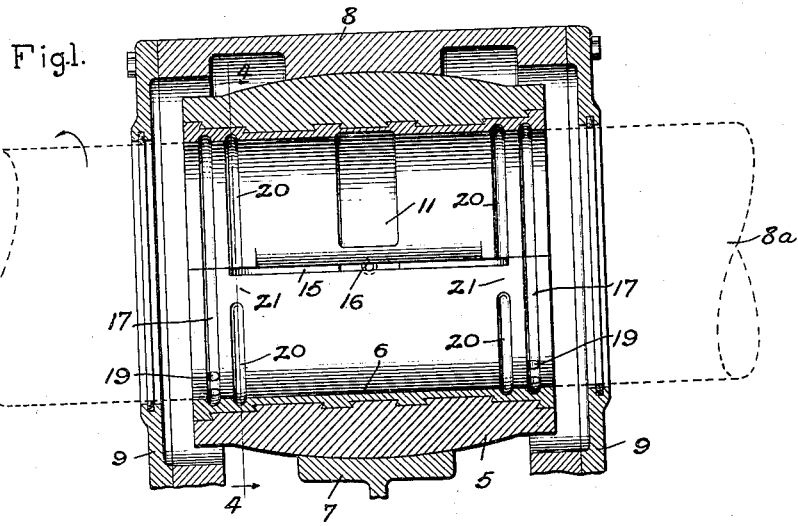
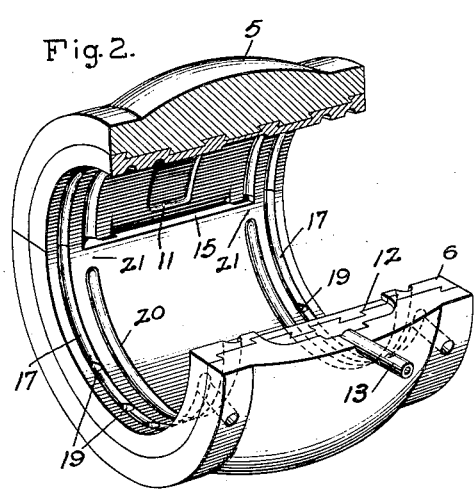
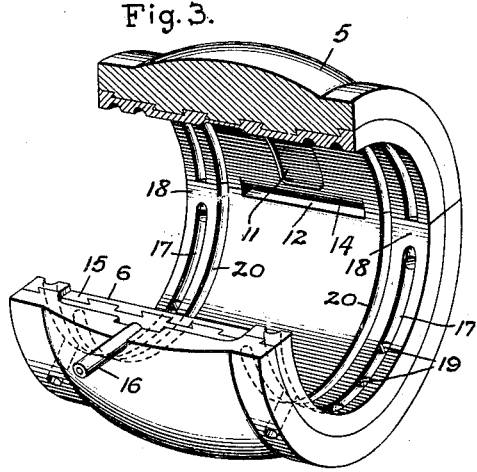
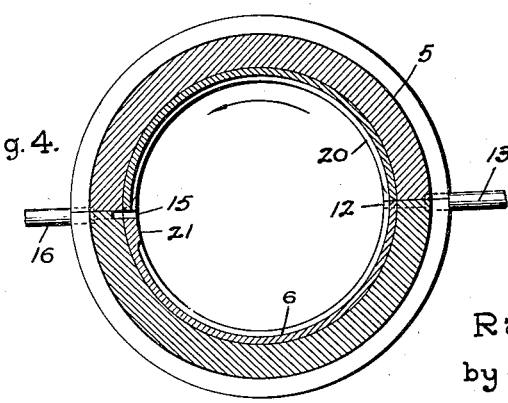
Inventor:
Raymond B. Wade,
by Charles E. Mullar
His Attorney.

Patented Mar. 7, 1933

1,900,593

UNITED STATES PATENT OFFICE

RAYMOND B. WADE, OF SWAMPSCOTT, MASSACHUSETTS, ASSIGNOR TO GENERAL ELECTRIC COMPANY, A CORPORATION OF NEW YORK

SHAFT BEARING

Application filed September 16, 1929. Serial No. 392,929.

The present invention relates to shaft bearings and especially to shaft bearings intended for use with shafts rotating at relatively high speeds and wherein oil is supplied to the bearings under pressure. In this connection it will be understood that oil is supplied not only for the purpose of lubricating the bearing but also for cooling it, and accordingly a relatively large quantity of oil is fed through the bearing.

A difficulty met with in connection with bearings of this type is that of foaming of the oil, and when oil foaming occurs there is presented the problem of carrying it away so as to prevent it piling up to an extent such that it leaks from the ends of the bearing bracket. This difficulty is further enhanced by the trend of modern design which is to reduce the floor space occupied by the apparatus and increase its capacity without increasing the bearing surfaces with the result of reducing the free space in which the foam may be dissipated.

The object of my invention is to provide an improved structure and arrangement in a bearing for effecting circulation of oil through the bearing whereby oil, or any foam generated in the bearing, will be carried away in a rapid and efficient manner, and for a consideration of what I believe to be novel and my invention, attention is directed to the accompanying description and the claims appended thereto.

In the drawing, Fig. 1 is an axial section of a bearing illustrative of my invention; Fig. 2 is a perspective view of the bearing with a part cut away, the view illustrating the same arrangement of parts as in Fig. 1; Fig. 3 is a similar view but taken from the opposite side, and Fig. 4 is a cross-section taken on line 4—4 of Fig. 1.

Referring to the drawing, 5 indicates a bearing block having a lining 6 of suitable bearing lining material. The bearing block is supported by a housing 7 having a removable cap or cover 8, the plane of division being axial and horizontal. 8a indicates the shaft which is shown in dotted lines in order not to obscure the parts of the lining. The shaft revolves in the direction indicated by the arrow. At the ends of the housing are two cover plates 9 through which the shaft extends.

The lining is made in two parts, the plane of division being axial and horizontal. In the upper half is a recess or pocket 11 which covers the greater part of the upper half of the shaft and from which oil freely flows into the channel 15. 12 indicates an elongated inlet slot or channel through which a relatively large amount of oil under suitable pressure is fed to the recess or pocket through the pipe 13. The upper wall 14 of the slot is curved so as to feed the oil evenly to the clearance space between the shaft and the lining and also to the recess, said channel being located at the horizontal joint and may be in one part or the other or partly in one and partly in the other. The opposite side of the lining is also provided with a similar elongated outlet slot or channel 15, Figs. 1 and 2, which is longer than the inlet slot or channel for a purpose to be mentioned later. It is in communication with the outlet pipe 16 through which oil is discharged under pressure to a suitable tank or reservoir (not shown) where any foam that may be present is dissipated.

At the ends of the lining are annular grooves 17 which practically surround the shaft, there being, however, a small dam 18 interposed at one end of each groove. The purpose of these grooves is to prevent as fully as possible the escape of oil from the inner grooves of the bearing.

The lower half of the lining is provided with a series of passages or conduits 19 which open into each groove 17 and convey oil therefrom to any suitable receptacle such as the bearing housing. As the shaft rotates at high speed it acts as a pump for the oil, carrying it from the upper to the lower side thereof. Owing to the presence of the dams 18 oil is prevented from going entirely around the shaft, and any oil collecting in the grooves 17 is discharged through the passages or conduits 19 which are numerous and offer small resistance to flow.

Formed in the working face of the lining and between the source of oil supply, i. e., the channel 12 and the grooves 17, are other annular oil grooves 20. For convenience these will be termed the inner grooves, and the grooves 17 the outer grooves. The inner grooves surround the shaft except for the small dams 21. These dams for the inner grooves are disposed diametrically opposite the dams 18 of the outer grooves and at one end each communicates with the outlet channel 15 which is made long enough for the purpose. Some of the oil which flows right and left from the recess 11 and inlet 12 is received by these inner grooves and the shaft acting as a pump carries it from the place where it is received around to the channel 15 where it unites with the oil from the recess 11 in the upper half of the lining and is discharged to a receiving tank by the pipe 16. The action of the rapidly rotating shaft is such as to force not only the main body of oil from the recess 11 but also that from the inner grooves under considerable pressure into and through the discharge pipe 16.

The presence of a dam 21 at one end of each of the inner grooves 20 results in an appreciable building-up of the oil pressure at said end with the further result that some of the oil in the region of the dam may be forced laterally toward the ends of the lining. The escape of such oil from the ends of the lining is prevented by the outer grooves 17. It is to reduce this tendency to leakage that the dams of one set of grooves are angularly displaced from those of the other set by substantially 180°. Should the dams be located on the same side of the bearing and in the same axial alignment the pressure at one dam in one groove due to the rotation of the shaft would be largely added to that due to the dam in the adjacent groove and would be highly objectionable as the leakage would thereby be greatly increased.

In operating bearings of my improved construction with a four inch shaft revolving at about 8000 R. P. M. as much as six gallons of oil per minute may be fed thereto and taken away by the inner grooves, channel 15 and discharge pipe 16 with only about a pint of oil escaping through both of the outer grooves 17. The passage of such a large volume of oil through the bearing not only lubricates it but effectively cools it as well. Furthermore, by arranging the parts as shown and piping the discharged oil to a tank of sufficient area any oil foam which may be formed within the bearing is reduced to a small or negligible value, and such foam as is formed is quickly dissipated in the tank. In this connection it may be said that when oil foam in large amount is generated within the bearing the difficulties of confining it are very greatly increased over those experienced when the oil is kept in liquid form. With bearings of prior art having an inlet pipe and a gravity discharge pipe it was found that under usual conditions of operation the gravity drain line would drain off the solid oil but would not float the foam away which would build up until it was thrown out around the shaft. I attribute the success of my improved bearing to the fact that large amounts of oil are forced through the bearing under suitable pressure and conducted away through a closed piping system in much the same manner as it is supplied to the lining through the inlet which thereby prevents foaming within the bearing bracket and also to the use of the inner grooves which practically prevent escape of oil outward from them and the admission of air, such oil as does escape being caught by the outer grooves and returned to the source of supply through the gravity system.

Another advantage of my improved construction is that scoring of the lining due to dirt in the oil is prevented due to the fact that the channel 15 is in communication with both of the inner grooves 20 and through which recess all dirt is freely discharged.

It will be seen that my invention is directed to a system of lubrication in which the oil is fed into the lining under pressure, is used for lubrication and also for cooling, and is then pumped out under pressure due to the rotation of the shaft and the inner set of grooves and their dams, and this with practically no leakage or discharge from the ends of the lining or admission of air and that such leakage as does exist is discharged downwardly by gravity through the passage leading from the pair of outer grooves.

What I claim as new and desire to secure by Letters Patent of the United States is:

1. A shaft bearing having a centrally arranged, circumferentially extending oil receiving recess opening into the bearing surface in its upper half, a horizontal channel which supplies oil to the recess, a conduit for supplying oil under pressure to the channel, a pair of annular grooves in the working surface of the bearing each of which is provided with a dam at one end, a second horizontal channel in the bearing surface to which the other ends of the grooves are connected and deliver oil under pressure above that of the atmosphere due to the source of supply and to the rotation of the shaft, and a conduit by which oil from the second channel is continuously discharged under pressure.

2. A shaft bearing having an oil receiving recess opening into the bearing surface in its upper half, a horizontal channel which supplies oil to the recess, a conduit for supplying oil under pressure to the channel, a pair of inner grooves in the working surface of the bearing which are provided with dams at one end, a second horizontal channel to which the other ends of the grooves are connected and deliver oil, a conduit by which oil from the second channel is discharged, a pair of outer grooves and discharge passages for the last named grooves which receive the oil which leaks outward from the inner grooves, each of the outer grooves defining a dam located opposite the dam defined by the inner grooves.

3. A shaft bearing which has a set of inner and a set of outer annular grooves in its working surface, oil discharge passages for the set of outer grooves, a dam for one end of each of said grooves, those of one set being substantially diametrically opposite those of the other set, a conduit for continuously supplying oil under pressure to the bearing in substantial quantities which is out of direct communication with all of the grooves, and a discharge conduit which is in direct communication with the set of inner grooves and through which oil flows continuously away from the bearing.

4. A shaft bearing which has an oil recess in its upper half, and a set of inner and a set of outer annular grooves in its working surface, a dam for one end of each of the grooves, an axially extending channel situated between the inner grooves but out of direct communication therewith which feeds oil to the recess under pressure, a second channel diametrically opposite the first which receives oil from the recess and from the set of inner grooves, a discharge conduit connected to the channel for receiving oil, and conduit means for discharging oil from the set of outer grooves.

5. A shaft bearing which has a central recess in its upper half, a source including a conduit for supplying oil thereto under a substantial pressure, sets of inner and outer annular grooves formed in the working surface of the bearing to prevent end leakages, a dam for each end of each groove, a channel which is common to the recess and to one set of grooves and through which the oil flows under pressure due to said source and to the pumping action of the shaft, a discharge conduit in communication with the channel, and oil discharging means independent of said conduit for the outer set of grooves.

6. A shaft bearing having a lining with two diametrically opposite arranged axial grooves in the inner face thereof, means for supplying oil to one of the grooves, means for discharging oil from the other groove, a pair of inner circumferential grooves in the working surface of the lining, each having one end extending to one side of the oil-discharge groove and another end terminating at a short distance from the other side of the oil-discharge groove to define a dam, a pair of outer circumferential grooves for collecting leakage-oil, and means for discharging the leakage-oil from the outer grooves, each of the outer grooves defining a dam located opposite the corresponding dam defined by the adjacent inner groove.

In witness whereof, I have hereunto set my hand this twelfth day of September, 1929.

RAYMOND B. WADE.